US011712057B2

(12) United States Patent
Malshe et al.

(10) Patent No.: US 11,712,057 B2
(45) Date of Patent: Aug. 1, 2023

(54) CONVERGENT MANUFACTURING PLATFORM CAPABLE OF ADDITIVE-SUBTRACTIVE-ASSEMBLY PROCESSES AND SYSTEMS

(71) Applicant: Purdue Research Foundation, West Lafayette, IN (US)

(72) Inventors: Ajay P. Malshe, West Lafayette, IN (US); Harshavardhan A. Malshe, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 61 days.

(21) Appl. No.: 17/172,233

(22) Filed: Feb. 10, 2021

(65) Prior Publication Data

US 2021/0244067 A1    Aug. 12, 2021

Related U.S. Application Data

(60) Provisional application No. 62/972,600, filed on Feb. 10, 2020.

(51) Int. Cl.
*B33Y 10/00* (2015.01)
*B33Y 50/02* (2015.01)
(Continued)

(52) U.S. Cl.
CPC ............ *A23P 20/20* (2016.08); *B33Y 10/00* (2014.12); *B33Y 30/00* (2014.12); *B33Y 50/02* (2014.12);
(Continued)

(58) Field of Classification Search
CPC ......... A23P 20/20; B33Y 10/00; B33Y 30/00; B33Y 50/02; B29C 64/171; B29C 64/182
See application file for complete search history.

(56) References Cited

U.S. PATENT DOCUMENTS

2010/0021580 A1*  1/2010  Swanson ............... B33Y 30/00
                                                          425/132
2015/0290878 A1*  10/2015 Houben ............... B29C 64/141
                                                          264/603
(Continued)

OTHER PUBLICATIONS

U.S. Army Stand-To! | Army Advanced Manufacturing Initiative, Oct. 4, 2019.
(Continued)

*Primary Examiner* — Joseph S Del Sole
*Assistant Examiner* — John Robitaille
(74) *Attorney, Agent, or Firm* — Piroozi-IP, LLC (57) ABSTRACT

A convergent three-dimensional (3D) additive manufacturing system is disclosed which includes a header, a base, a first dispensing system mounted onto the header, the space between the header and the base adjacent to the first dispensing system defining a first zone, a second dispensing system mounted onto the header, the space between the header and the base adjacent the second dispensing system defining a second zone, the first zone, and the second zone are separated by a screen adapted to prevent contamination across the first and second zones, the first dispensing system carrying raw material for a first product, and the second dispensing system carrying raw material for a second product.

20 Claims, 6 Drawing Sheets

(51) Int. Cl.
  A23P 20/20    (2016.01)
  B33Y 30/00    (2015.01)
  F42B 33/00    (2006.01)
  A23P 20/25    (2016.01)
(52) U.S. Cl.
  CPC ......... A23P 2020/253 (2016.08); F42B 33/00 (2013.01)

(56) References Cited

U.S. PATENT DOCUMENTS

| | | | |
|---|---|---|---|
| 2016/0178336 A1 | 6/2016 | Jennett et al. | |
| 2018/0222111 A1 | 8/2018 | Bayer et al. | |
| 2018/0311731 A1* | 11/2018 | Spicer | B22F 12/49 |
| 2019/0381603 A1 | 12/2019 | Lan et al. | |

OTHER PUBLICATIONS

McCarthy et al., 2019 Army Modernization Strategy: Investing in the Future, 14, 2019.
Best, Army looks toward future of additive, advanced manufacturing—APG News, Feb. 27, 2019.
McNally, Army laboratory shapes future research—APG News, Mar. 30, 2017.
Harper, Special Report: Army R&D—ARL Director Focused on 10 Top Priorities, Oct. 10, 2019.
McWilliams, Center for Agile Materials Manufacturing Science (CAMMS) | Open Campus, Date Unknown.
Mazak, Integrex i-400AM, Date Unknown.
Hybrid Manufacturing Technologies—Home, Date Unknown.
Optomic, Lens 860 Machine Tool Systems—Optomec, Date Unknown.
DMG MORI, Lasertec 65 3D hybrid—Additive Manufacturing machines from DMG MORI, Date Unknown.
Matsurra Machinery Corporation, LUMEX Avance-60 | Hybrid Metal 3D Printer LUMEX Series, Date Unknown.
3D Hybrid: AM for CNC—Home, Date Unknown.
Vaezi et al., Multiple material additive manufacturing—Part 1: A review: Virtual and Physical Prototyping, 8:1, 19-50, 2013.
Bandyopadhyay et al., Additive manufacturing of multi-material structures, Materials Science and Engineering R: Reports, 129, 2018.
Chueh et al., Additive manufacturing of hybrid metal/polymer objects via multiple-material laser powder bed fusion, Additive Manufacturing, 36, 101465, 2020.
Chueh et al., Additive manufacturing of polymer-metal/ceramic functionally graded composite components via multiple material laser powder bed fusion, Journal of Manufacturing Science and Engineering, Transactions of the ASME, 142, 2020.
Silva et al., Application of a Hybrid Additive Manufacturing Methodology to Produce a Metal/Polymer Customized Dental Implant, Procedia Manufacturing, 12, 150-155, 2017.
Hwang et al., Thermo-mechanical Characterization of Metal/Polymer Composite Filaments and Printing Parameter Study for Fused Deposition Modeling in the 3D Printing Process, Journal of Electronic Materials, 44, 771-777, 2015.
Roach et al., The m4 3D printer: A multi-material multi-method additive manufacturing platform for future 3D printed structures, Additive Manufacturing, 29, 100819, 2019.
Ozlati et al., An alternative additive manufacturing-based joining method to make Metal/Polymer hybrid structures, Journal of Manufacturing Processes, 45, 217-226, 2019.
Lauwers et al., Hybrid processes in manufacturing, CIRP Annals—Manufacturing Technology, 63, 561-583, 2014.
Sealy et al., Hybrid processes in additive manufacturing, Journal of Manufacturing Science and Engineering, Transactions of the ASME, 140, 2018.
Chueh et al., Integrated laser-based powder bed fusion and fused filament fabrication for three-dimensional printing of hybrid metal/polymer objects, Additive Manufacturing, 31, 100928, 2020.
Matsuzaki et al., Multi-material additive manufacturing of polymers and metals using fused filament fabrication and alectroforming. Additive Manufacturing, 29, 100812, 2019.
Yin et al., Hybrid additive manufacturing of Al—Ti6Al4V functionally graded materials with selective laser melting and cold spraying, Journal of Materials Processing Technology, 255, 650-655, 2018.
Koopmann et al., Additive Manufacturing of a Steel-Ceramic Multi-Material by Selective Laser Melting, Metallurgical and Materials Transactions B: Process Metallurgy and Materials Processing Science, 50, 1042-1051, 2019.
Falck et al., AddJoining: A novel additive manufacturing approach for layered metal-polymer hybrid structures, Materials Letters, 217, 211-214, 2018.
Sun et al., Effects of CO2 Laser Surface Processing on Fracture Behavior of Silicon Nitride Ceramic, Journal of Engineering Materials and Technology, 128, 460-467, 2006.
Malshe et al., Bio-inspired textures for functional applications, CIRP Annals—Manufacturing Technology, 67, 627-350, 2018.
Chu et al., From Design for Manufacturing (DFM) to Manufacturing for Design (MFD) via Hybrid Manufacturing and Smart Factory: A Review and Perspective of Paradigm Shift, International Journal of Precision Engineering and Manufacturing-Green Technology 3(2), 209-222, Apr. 2016.
Hossain et al., Fabrication of smart parts using powder bed fusion additive manufacturing technology, Additive Manufacturing 10, 58-66, 2016.
Li et al., Hybrid additive manufacturing of 3D electronic systems, J. Micromech. Microeng. 26 105005, 2016.
Wei et al., Embedding anti-counterfeiting features in metallic components via multiple material additive manufacturing, Additive Manufacturing 24, 1-12, 2018.
Mei et al., Interfacial characterization and mechanical properties of 316L stainless steel/inconel 718 manufactured by selective laser melting, Materials Science & Engineering A 758, 185-191, 2019.
Chen et al., Interfacial microstructure and mechanical properties of 316L /CuSn10 multi-material bimetallic structure fabricated by selective laser melting, Materials Science & Engineering A 752, 75-85, 2019.
Weflen et al., Hybrid additive and subtractive manufacturing of multi-material objects, Rapid Prototyping Journal, 27 (10), 1860-1871, 2021.
Malviya et al., Digital Design Automation to Support In Situ Embedding of Functional Objects in Additive Manufacturing, Journal of Mechanical Design, 142, Nov. 2020.
Bai et al., Experimental study on additive/subtractive hybrid manufacturing of 6511 steel: process optimization and machining characteristics, The International Journal of Advanced Manufacturing Technology, 108, 1389-1398, 2020.
Juhasz et al., Hybrid directed energy deposition for fabricating metal structures with embedded sensors, Additive Manufacturing 35, 101397, 2020.
Chen et al., Influence mechanism of process parameters on the interfacial characterization of selective laser melting 316L/CuSn10, Materials Science & Engineering A 792, 139316, 2020.
Tapoglou et al., Investigation of hybrid manufacturing of stainless steel 316L components using direct energy Teposition, Proc IMechE Part B: J Engineering Manufacture 235(10), 1633-1643, 2021.
Wei et al., Microstructure and Mechanical Property of Ti—5Al—2.5Sn/Ti—6Al—4V Dissimilar Titanium Alloys Integrally Fabricated by Selective Laser Melting, JOM, 72(3), 2020.
Lambiase et al., A State-of-the-Art Reviewon Advanced Joining Processes for Metal-Composite and Metal-Polymer Hybrid Structures, Materials, 14, 1890, 2021.
Caramuccia et al., Development of processing strategies for multigraded selective laser melting of Ti6Al4V and IN718, Powder Technology 367, 376-389, 2020.
Tan et al., Additive manufacturing of steel-copper functionally graded material with ultrahigh bonding strength, Journal of Materials Science & Technology 72, 217-222, 2021.
Wei et al., Recent progress and scientific challenges in multimaterial additive manufacturing via laser-based powder bed fusion, Virtual and Physical Prototyping, 16:3, 347-371, 2021.

(56) References Cited

OTHER PUBLICATIONS

Tey et al., Additive manufacturing of multiple materials by selective laser melting: Tialloy to stainless steel via a Cu-alloy interlayer, Additive Manufacturing 31, 100970, 2020.

Yusuf et al., Interfacial characterisation of multi-material 316L stainless steel/Inconel 718 fabricated by laser powder bed fusion, Materials Letters 284, 128928, 2021.

Sealy et al., Glocal integrity in 420 stainless steel by asynchronous laser processing, CIRP Annals—Manufacturing Technology 68, 189-192, 2019.

* cited by examiner

CONVERGENT MANUFACTURING PLATFORM CAPABLE OF ADDITIVE-SUBTRACTIVE-ASSEMBLY PROCESSES AND SYSTEMS

CROSS-REFERENCE TO RELATED APPLICATIONS

The present patent application is related to and claims the priority benefit of U.S. Provisional Patent Application Ser. No. 62/972,600 filed Feb. 10, 2020, the contents of which are hereby incorporated by reference in its entirety into the present disclosure.

STATEMENT REGARDING GOVERNMENT FUNDING

The technology associated with the present disclosure was not made with government support.

TECHNICAL FIELD

The present disclosure generally relates to additive-subtractive manufacturing, and in particular, to hybrid materials, designs, processes, and system capable of manufacturing parts based on additive and subtractive techniques as well as assembly of subsystems all within a unified platform.

BACKGROUND

This section introduces aspects that may help facilitate a better understanding of the disclosure. Accordingly, these statements are to be read in this light and are not to be understood as admissions about what is or is not prior art.

Additive manufacturing nowadays is ubiquitous. Generally, according to one perspective additive manufacturing is a form of three-dimensional (3D) printing where the raw material is deposited according to a pattern controlled by a computer, and then solidified by adding energy in the form of laser or ultraviolet curing. The material is added layer-by-layer. In doing so, depending on the part being manufactured, a scaffold may need to be built with the part in order to support various aspects of the part; the scaffold is subsequently removed to reveal the part intended. This approach is to be contrasted with a traditional machining approach, e.g., a lathe, where a stock of plastic is placed in the machining tool and unwanted portions are removed to reveal the desired part. A major advantage of additive manufacturing is the ability to manufacture parts that are impossible or nearly impossible to make via machining, subtractive manufacturing. With additive manufacturing, a host of parts with complex design structures can be made having a variety of different materials, such as metals, plastics, etc. In addition to additive manufacturing, subtractive manufacturing can also be used to remove portions from a part by using a high-energy apparatus, such as laser or by machining. Often, in complex 3D printing systems, both additive, subtractive and assembly capabilities are not integrated. An example of a hybrid machine is provided in U.S. Pub. App. No. 2019/0381603 for Lan et al.

More recently, additive manufacturing has been used to make exotic products, such as food items and munition components. For example, U.S. Pub. App. No. 2016/0178336 for Jennett et al., describes a munition manufacturing process using additive manufacturing where a casing is manufactured by additive manufacturing layer by layer, and where voids are produced by omitting solid material from the layers as appropriate. Jennett et al., teaches the casing may be built up from layers of 10-micron stainless steel particles (spheres) that are selectively fused using laser sintering. The voids may be filled in whole or in part with another material, e.g., a phase-change material. According to another example, U.S. Pub. App. No. 2018/0222111 for Bayer et al., an additive manufacturing system is disclosed, which provides a material comprised of an ethylcellulose polymer. The material is heated and ejected in an extrusion-style manner through a nozzle onto a base. Either the base, nozzle, or both are moved while dispensing the material so that there is the horizontal displacement between the base and nozzle according to a predetermined pattern. The article formed of the ethylcellulose polymer may be used in many applications such as those related to the pharmaceutical and food industries.

Soldiers on the battlefield have many immediate needs and effective operations use food for nutrition and energetic materials for munition. One such need is to have access to nutrition through manufactured food from raw materials. Another such example is that a soldier or a unit of soldiers need access to munition through the manufacturing of parts of munition, or parts of equipment that have broken down. As it is known, they can use an additive manufacturing system to do so. However, with the advent of additive manufacturing food-based products, such as that disclosed in U.S. Pub. App. No. 2018/0222111 for Bayer et al., the same additive manufacturing machine can also be used for manufacturing foods. Currently, soldiers are limited to meals ready to eat (MRE), which can provide nutritional requirements for 3-weeks, however, while each pack does not need to be refrigerated, its shelf-life is dependent on the ambient temperature. Also, the biology of every soldier is different and single format of MRE cannot fit all. Advantageously, additively manufacturing food, may allow for more nutritionally rich food, with better taste, and with improved shelf-life and designed for specific biology.

However, a significant challenge remains to separate raw materials used during the deposition process in additive manufacturing for different applications. For example, it will not be acceptable to allow any of the raw materials for munition manufacturing to enter into the food manufacturing process.

Therefore, there is an unmet need for a novel hybrid system capable of manufacturing parts or items based on additive and subtractive techniques all within a unified platform that is capable of manufacturing a variety of different products.

SUMMARY

A convergent three-dimensional (3D) additive manufacturing system is disclosed. The system includes a header and a base. The system also includes a first dispensing system mounted onto the header. The space between the header and the base adjacent the first dispensing system defines a first zone. The system also includes a second dispensing system mounted onto the header. The space between the header and the base adjacent the second dispensing system defines a second zone. The first zone and the second zone are separated by a screen adapted to prevent contamination across the first and second zones. The first dispensing system carries raw material for a first product, while the second dispensing system carries raw material for a second product.

A method of three-dimensional (3D) additive manufacturing is also disclosed. The method includes mounting a first dispensing system onto a header adjacent to a base. The space between the header and the base defines a first zone. The method also includes mounting a second dispensing system onto the header. The space between the header and the base defines a second zone. The method also includes separating the first zone and the second zone by a screen adapted to prevent contamination across the first and second zones. The first dispensing system carries raw material for a first product, while the second dispensing system carries raw material for a second product.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Figure 1:
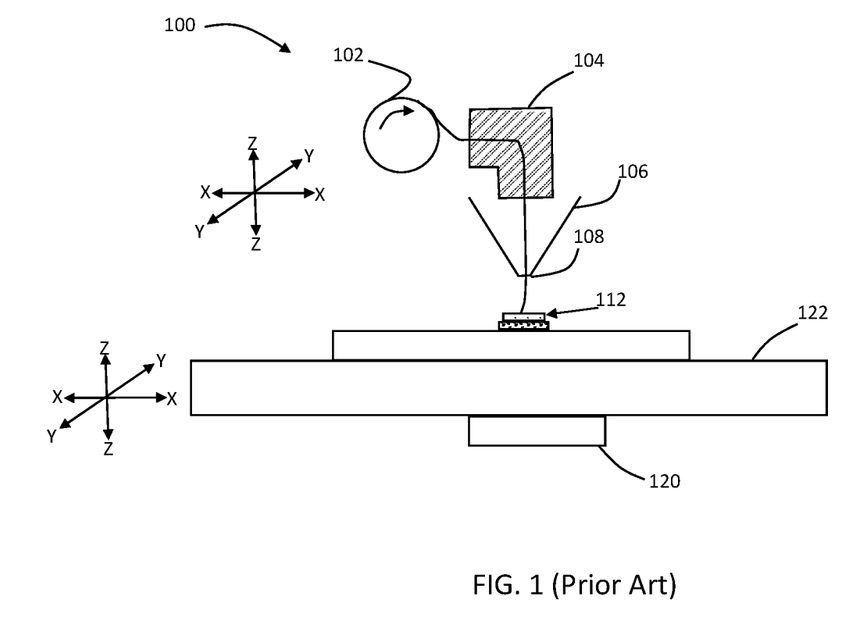
FIG. 1 is a schematic view of a three-dimensional (3D) additive manufacturing system.

Referring to FIG. 1, a traditional three-dimensional (3D) additive manufacturing system 100 is shown. Typically these machines include a spool 102 of raw material. The spool 102 carries a tape of raw material, which is guided through a filament guide 104 and through a nozzle 106. The nozzle is heated by a heater 108 to melt the raw material or at least softens it so that it can pass through the nozzle 106 and on to a base carrier 110 in order to make a part 112 layer-by-layer. A control system 120 either translationally moves a 3D platform 122 in X-Y-Z directions, translationally moves the nozzle 106 in X-Y-Z, or a combination of the two. Another coordinate system besides the Cartesian coordinate system is also possible, such as cylindrical, or spherical. As discussed above, this type of 3D manufacturing system 100 would suffer from contamination of one raw material into parts made with another raw material. For example, suppose initially the filament spool 102 carries munition raw material. By exchanging the spool with a new spool 102 carrying nutritional raw material, there will be a significant possibility that the nutritional part 112 will be contaminated with raw material from munition raw material which would be toxic for human consumption.

Figure 2:
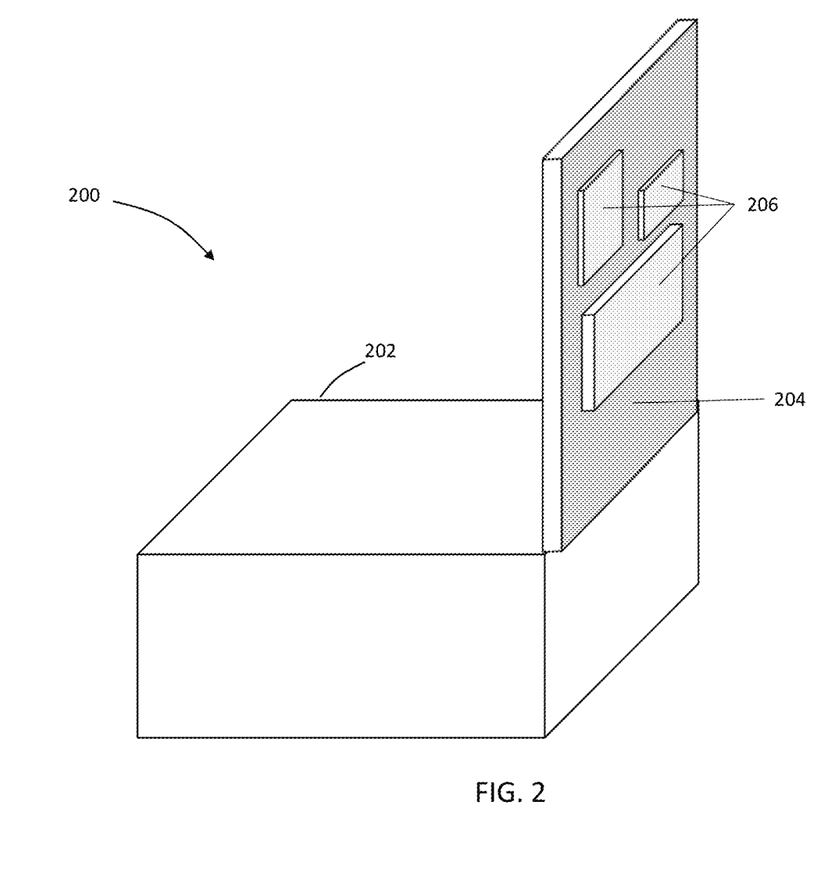
FIG. 2 is a high-level schematic view of a 3D additive manufacturing system according to the present disclosure.
Figure 3:
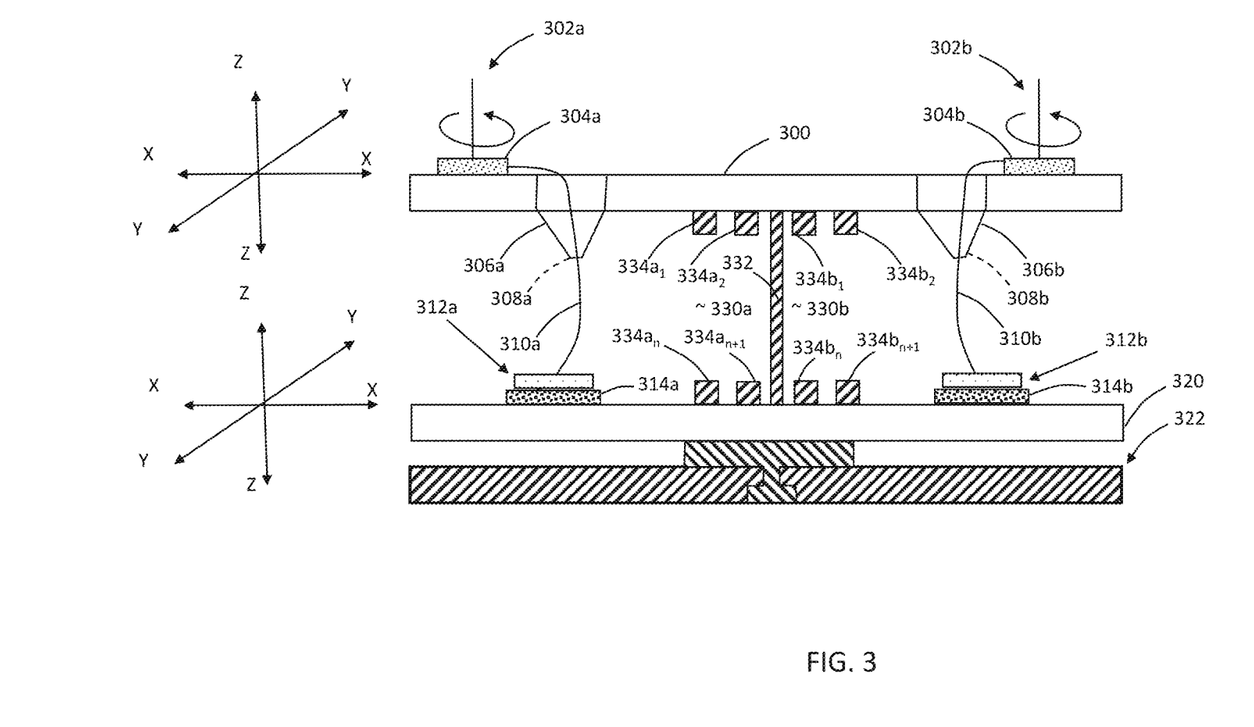
FIG. 3 is a schematic view of components within the high-level schematic view of FIG. 2, according to one embodiment of the present disclosure.

Referring to FIGS. 2-3, schematic views of a novel hybrid system are shown capable of manufacturing parts or items based on additive and subtractive techniques all within a unified platform that is capable of manufacturing a variety of different products. In particular, FIG. 2 shows a perspective view of one of the examples, whereby a novel convergent platform 200 which is a multi-source 3D printer with assembly facility encased in a rugged case 202 having a lid 204 with 3D printer controls 206 disposed thereon.

Inside the rugged case 202 of FIG. 2, the novel convergent platform 200 includes components shown in the schematic of FIG. 3. Two nozzle systems 302a and 302b are shown. Each nozzle system 302a and 302b includes a spool 304a and 304b carrying a respective raw material. For example, the spool 304a carries nutritional raw material while spool 304b carries munition raw material. Each nozzle system 302a and 302b also includes a nozzle 306a and 306b. The nozzles 306a and 306b receive the raw material from the respective spools 304a and 304b and eject the raw material as a stream 310a and 310b, respectively, onto a thermally controlled stage 320. Each nozzle 306a and 306b also optionally includes heaters 308a and 308b in order to prepare the respective raw materials for ejection out of the nozzles 306a and 306b. Each of the two nozzle system 302a and 302b is coupled to a header 300 and are capable of independent operation. These two nozzle systems 302a and 302b are capable of 3D printing respective parts 312a and 312b, simultaneously or at different times. In order to maintain a separation and avoid contamination between one stream 310a and the second stream 310b, a screen 332 is provided to establish two zones 330a and 330b. These two zones 330a and 33b allow zones of operation without material from one zone, e.g., 330b entering material into the second zone, e.g., 330a. Screen 332 may be a flexible screen. The respective parts 312a and 312b are formed on the thermally controlled stage 320 which is mounted on a base 322. A controller (not shown) is adapted to either translationally moves the base 322 in X-Y-Z directions, translationally moves the header 300 and thus the nozzles 306a and 306b in X-Y-Z, or a combination of the two. Another coordinate system besides the Cartesian coordinate system is also possible, such as cylindrical, or spherical. The parts 312a and 312b are manufactured on carrier scaffolds 314a and 314b, respectively, which may also be used as a packaging material to enclose the parts 312a and 312b using one or more assembly arms (not shown).

A plurality of sensors and detectors shown as $334a_1$, $334a_2$, $334a_n$, and $334a_{n+1}$ disposed in zone 330a, as well as $334b_1$, $334b_2$, $334b_3$, and $334b_{n+1}$ disposed in zone 330b including optical sensors, chemical sensors, and other sensors known to a person having ordinary skill in the art can be provided in each zone to detect minute traces of raw material from corresponding other zones. Once these detectors identify inappropriate intrusion of such raw material into a respective zone, the detectors can signal the controller (not shown) of contamination with a measurement (e.g., parts per million, PPM). The controller (not shown) can be programmed to establish a threshold of contamination acceptable, e.g. for human consumption. The controller (not shown) may be adapted to continuously indicate a PPM measurement on a screen (not shown) located on the lid 204 of case 202 (see FIG. 2). Once the threshold is crossed, the controller (not shown) can be programmed to immediately stop production of the part and provide warnings to a user.

Figure 4:
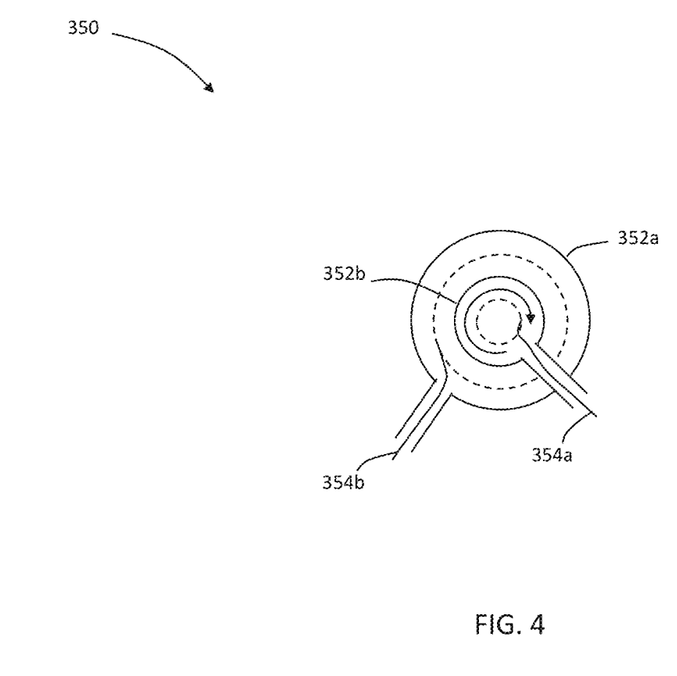
FIG. 4 is a schematic of an alternative embodiment of spools used in the 3D additive manufacturing arrangement of the present disclosure.

Referring to FIG. 4, an alternative spool 350 configuration is shown. In this configuration, concentric spools 352a and 352b are adapted to carry two different raw materials 354a and 354b, respectively. Each of the two spools 352a and 352b can be adapted to rotate independent of the other spool, or adapted to rotate in a dependent manner with the other spool. An internal structure (not shown) can be adapted to separate the two raw materials 354a and 354b to avoid contamination thereof.

Figure 5:
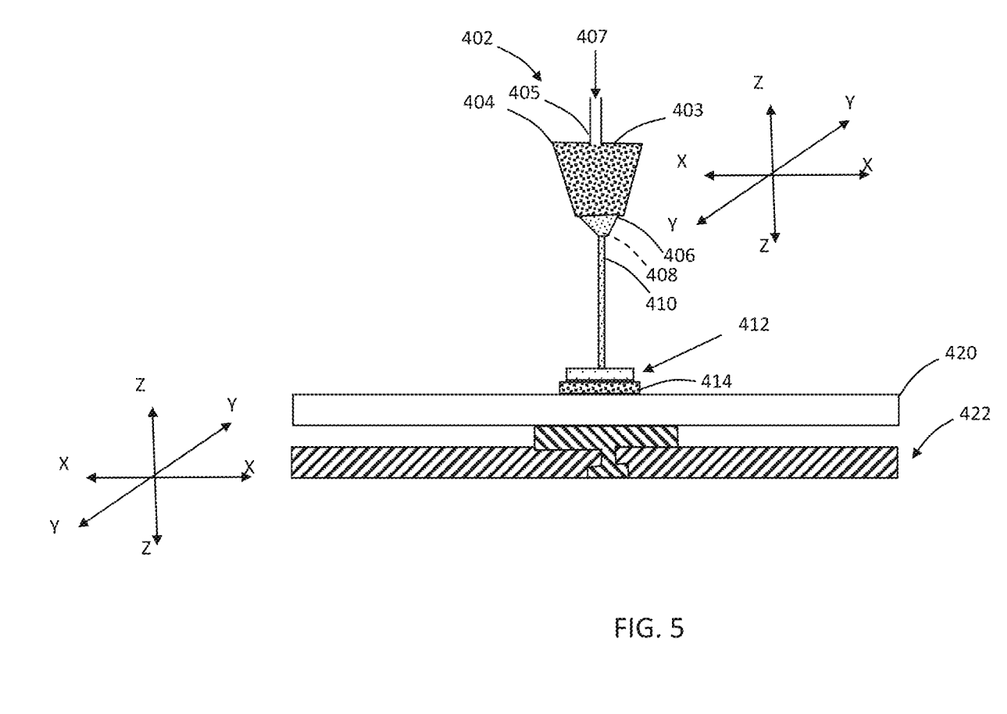
FIG. 5 is a schematic view of components of 3D manufacturing arrangement, according to another embodiment of the present disclosure.

Referring to FIG. 5, an alternative embodiment to the embodiment shown in FIG. 4 which implements spools (e.g., 352a and 352b) is provided. Here, a nozzle system 402 is attached to a header (not shown), the nozzle system 402 includes a powder cup 404 adapted to carry raw material 403 for a respective part (e.g., nutrition or munition). The powder cup includes an input 405 adapted to receive a solvent 407. In one subclass embodiment of the embodiment shown in FIG. 5, the solvent 407 could be aided with a diaphragm (not shown) to push powder material. The solvent 407 mixes with the raw material 403 and the mixture is thus ejected out of a nozzle 406, similarly as discussed above with respect to FIG. 3, thereby ejected as a stream 410 to form a part 412 on a thermally controlled stage 420 mounted on a base 422. The nozzle 406 may be outfitted with an optional heater 408. As discussed above, a controller (not shown) is adapted to either translationally moves the base 422 in X-Y-Z directions, translationally moves the header (not shown) and thus the nozzle 406 in X-Y-Z, or a combination of the two. Another coordinate system besides the Cartesian coordinate system is also possible, such as cylindrical, or spherical. Also, part 412 is manufactured on a carrier scaffold 414, which may also be used as a packaging material to enclose part 412 using an assembly arm (not shown).

It should be appreciated that in the setup of FIG. 3, layer-by-layer additive manufacturing will be accomplished using filament or tape as a raw material. After a pre-planned number of length of source raw material, a thread of raw material will be cut (not shown) using a machining tool (not shown) mounted on a fixture (not shown). Additive and subtractive functions will work synchronously or asynchronously. Other subtractive operation, depending upon the end product, e.g., munition system, can be carried out according to a subtractive process for finishing the surfaces with trimming and polishing tool mounted with an abrasive brush based on final manufacturing steps.

Unlike state of the art, the setup according to FIG. 3, the scaffold can also be used as a wrapper for packaging final system to avoid cross-contamination. Once the processing is complete, automated arms (not shown) mounted on sides of the wrapper scaffold carrier (not shown) can be used to close the package. According to one embodiment, this operation can be accompanied using an angular flip movement of two arms on both sides of a rectangular package with two flaps. The head of the arms can be equipped with a vacuum cup (not shown) to hold the package's top flap with precision. Once the package is closed, the package will be moved with another arm on materials handling transfer system (not shown).

It should be appreciated that in the present disclosure, the term additive manufacturing refers to 3D printing techniques where the material is added layer-by-layer in order to make the desired part. The term subtractive manufacturing refers to the removal of a part previously added by a high energy device, such as a laser, or by a cutting tool. The term additive-subtractive refers to manufacturing techniques capable of both additive and subtractive in one system.

Figure 6:
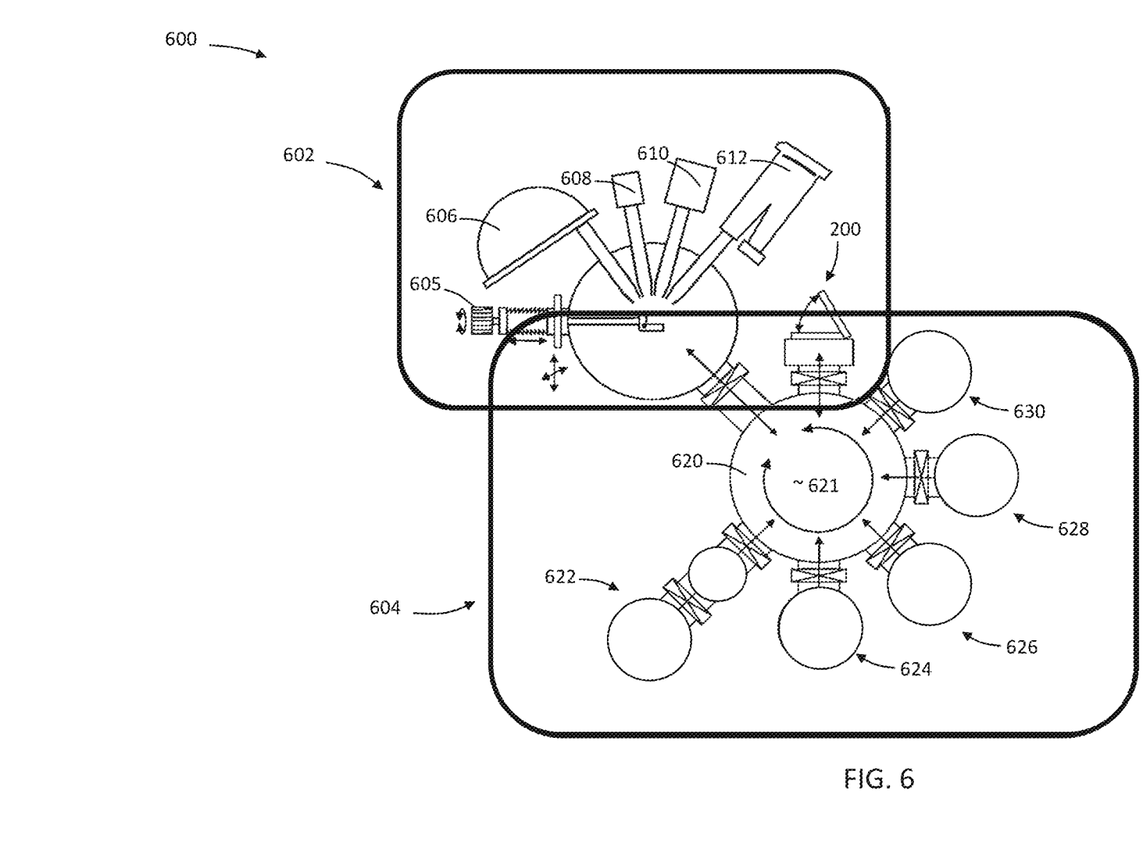
FIG. 6 is a schematic of a hybrid convergent 3D additive-subtractive manufacturing system, according to the present disclosure.

As discussed above, the converging manufacturing platform of the present disclosure is designed to provide various assembly, additive, and subtractive manufacturing details to a 3D printed part. Raw materials can include metals (e.g., in the form of powder) or polymers (e.g., also in the form of powder). These example raw materials (i.e., metals and polymers) have distinctively different material properties and thus multiple material additive manufacturing (MMAM) using metals and polymers is not used in the prior art. Also, using two different tools for printing metals and polymers would be beneficial for the same reason and thus used in the additive manufacturing of the present disclosure. To achieve this level of additive manufacturing approach, multiple tools are controlled and utilized, sequentially or in parallel according to the necessary process sequence guided by the design of the part. The individual tools (or modules of tools) are integrated into a 'turret' type assembly to switch between the processing/functions as needed. For example, multiple lasers are integrated within the additive assembly system each coupled to the turret to allow for different wavelengths and power densities to serve a specific laser function (e.g. laser machining vs. surface treatment). Subtractive manufacturing tools for material removal, e.g. texturing, are also integrated as needed for final finishing of the 3D printed part. Also, transformative manufacturing steps, using laser shock peening are applied intermittently to manage stress profile at dissimilar material interfaces. Dissimilar working environments are housed in separate functional chambers and the parts are transferred between the chambers as required using the cluster tool assembly. Referring to FIG. 6, an example schematic of a manufacturing environment using a tenet-like assembly is shown.

Referring to FIG. 6, a hybrid convergent 3D additive-subtractive manufacturing system 600 is shown. System 600 includes two major sub-systems: a post-processing and quality subsystem 602 and a manufacturing subsystem 604. The manufacturing subsystem 604 includes a tenet 620 adapted to rotate and bring about various 3D additive-subtractive components into and about a processing zone 621. The first of such components is the convergent platform 200 discussed above. Parts from this convergent platform 200 are conveyed to the processing zone 621 for additional processing by the various other components including a subtractive component 622 (e.g., a computer numerical control (CNC) machine), a polymer 3D printing component 624, a second polymer printing component 626 adapted to 3D print multi-polymer materials, a laser shock peening component 628 adapted to process the 3D printed part, and a metal printing component 630. The tenet 620 is adapted to rotate to bring each of the aforementioned components into the processing zone 621 for the respective processing.

The post-processing and quality subsystem 602 include a rectilinear and rotational advancing stage 605 adapted to move the subsystem 602 into the proper position for quality measurements as well as post-processing. The subsystem 602 further includes a quality inspection component 606 adapted to make optical, mechanical, and electronic measurements of the manufactured part, laser finishing components 608 and 610 operated at different wavelengths and intensity to post-process texture and surface attributes of the manufactured part, and a real-time process monitoring component 612 adapted to statistically measure significant characteristics of mass-production parts to establish manufacturing trends and statistical process control.

The two subsystems 602 and 604 are adapted to i) 3D manufacture (print) a part made up of multi-material (e.g., including several different polymers and metals all in one 3D printed part), remove unwanted aspects of the part via a subtractive component (e.g., a CNC machine), and then post-process the part by surface treating the part using various lasers and finally make intra-process measurements for manufacturing as well statistical process control. The approach shown in FIG. 6 advantageously addresses one key challenge in achieving layered metal-polymer geometry which is to ensure adhesion and bond strength between the two heterogeneous layers of dissimilar materials. It should be noted that the 'layers' discussed here are the individual geometric designs and not the layers corresponding to the additive manufacturing (AM) process. Lasers, as versatile energy sources, have been commonly used for many applications apart from consolidation (in AM processes), such as machining, surface activation, and thus are utilized as the energy source to achieve multiple functions. The laser processing and polymer deposition can be performed sequentially. The metal and polymer printing can be primarily through the binder jetting process to ensure that the metallic layers can be printed on top of the polymer layers without adversely affecting the polymer structure. Transformative laser processes can be used after each layer as needed. The purpose of these processes would be to manage the residual stresses in the part (by, e.g., shock peening) and to impart the surface finish/texture to the advantage based on PI's previous work on textured surfaces.

Those having ordinary skill in the art will recognize that numerous modifications can be made to the specific implementations described above. The implementations should not be limited to the particular limitations described. Other implementations may be possible.

The invention claimed is:

1. A convergent three-dimensional (3D) manufacturing system, comprising:
    a header;
    a base;
    a first dispensing system mounted onto the header, the space between the header and the base adjacent the first dispensing system defining a first zone;
    a second dispensing system mounted onto the header, the space between the header and the base adjacent the second dispensing system defining a second zone, the first zone, and the second zone are separated by a screen adapted to prevent contamination across the first and second zones;
    a controller; and
    a plurality of detectors in one or both of the first and the second zones, the plurality of detectors adapted to provide information about presence of raw materials from the first dispensing system in the second zone, or presence of raw materials from the second dispensing system in the first zone;
    the first dispensing system carrying raw material for a first product, and the second dispensing system carrying raw material for a second product.

2. The convergent 3D manufacturing system of claim 1, the first dispensing system and the second dispensing system adapted to dispense respective raw material, simultaneously.

3. The convergent 3D manufacturing system of claim 1, the first dispensing system and the second dispensing system adapted to dispense respective raw material, at different times.

4. The convergent 3D manufacturing system of claim 1, the controller configured to move i) the base; ii) the header; or iii) a combination of the base and the header.

5. The convergent 3D manufacturing system of claim 4, the movement of the base is according to movement in i) Cartesian coordinate system; ii) cylindrical coordinate system; or spherical coordinate system.

6. The convergent 3D manufacturing system of claim 1, the plurality of detectors include optical detectors.

7. The convergent 3D manufacturing system of claim 1, the plurality of detectors include chemical detectors.

8. The convergent 3D manufacturing system of claim 1, the first and second dispensing systems each includes a spool containing the respective raw material.

9. The convergent 3D manufacturing system of claim 8, the two spools are packaged in a concentric spool assembly having an inner spool, and an outer spool.

10. The convergent 3D manufacturing system of claim 9, wherein the inner spool is adapted to move independently from the outer spool.

11. The convergent 3D manufacturing system of claim 9, wherein the inner spool defines movement of the outer spool.

12. The convergent 3D manufacturing system of claim 9, wherein the outer spool defines movement of the inner spool.

13. The convergent 3D manufacturing system of claim 1, the first and second dispensing system each includes a powder cup with an inlet adapted to receive a solvent.

14. The convergent 3D manufacturing system of claim 1, further comprising a subtractive manufacturing sub-system adapted to remove unwanted portions of the first or second products.

15. The convergent 3D manufacturing system of claim 1, further comprising an assembly sub-system adapted to assemble the first or second products with one or more components, thereby generating a system of products.

16. A convergent three-dimensional (3D) manufacturing system, comprising:
    a header;
    a base;
    a first dispensing system mounted onto the header, the space between the header and the base adjacent the first dispensing system defining a first zone,
    a second dispensing system mounted onto the header, the space between the header and the base adjacent the second dispensing system defining a second zone, the first zone, and the second zone are separated by a screen adapted to prevent contamination across the first and second zones;
    the first dispensing system carrying raw material for a first product, and the second dispensing system carrying raw material for a second product,
    wherein the first and second dispensing systems each includes a spool containing the respective raw material, and
    wherein the two spools are packaged in a concentric spool assembly having an inner spool, and an outer spool.

17. The convergent 3D manufacturing system of claim 16, wherein the inner spool is adapted to move independently from the outer spool.

18. The convergent 3D manufacturing system of claim 16, wherein the inner spool defines movement of the outer spool.

19. The convergent 3D manufacturing system of claim 16, wherein the outer spool defines movement of the inner spool.

20. The convergent 3D manufacturing system of claim 16, the first and second dispensing system each includes a powder cup with an inlet adapted to receive a solvent.

* * * * *